United States Patent [19]

Satake

[11] Patent Number: 4,634,412

[45] Date of Patent: Jan. 6, 1987

[54] BELT CONNECTOR DEVICE

[75] Inventor: Toshihiko Satake, Higashihiroshima, Japan

[73] Assignee: Satake Engineering Co., Ltd., Tokyo, Japan

[21] Appl. No.: 721,592

[22] Filed: Apr. 10, 1985

[30] Foreign Application Priority Data

Apr. 20, 1984 [JP]  Japan .................................. 59-80757

[51] Int. Cl.⁴ .............................................. F16G 3/00
[52] U.S. Cl. .................................... 474/253; 474/257; 198/846
[58] Field of Search ............... 474/253, 255, 257, 101, 474/131; 24/31 R, 31 C; 198/844, 846, 813, 711, 713, 714

[56] References Cited

U.S. PATENT DOCUMENTS

| 934,321 | 9/1909 | Kidwell | 474/257 X |
| 2,687,209 | 8/1954 | Rost et al. | 198/846 X |

FOREIGN PATENT DOCUMENTS 2519333 11/1976 Fed. Rep. of Germany .
5183 6/1892 Switzerland .

*Primary Examiner*—Stephen J. Novosad
*Assistant Examiner*—Thuy M. Bui
*Attorney, Agent, or Firm*—Henry Sternberg; Bert J. Lewen

[57] ABSTRACT

A belt connector device for connecting opposite end portions of a belt to each other to form an endless belt assembly for use in belt type delivery apparatus comprises a mounting assembly which includes a pair of opposed, but spaced side wall members. First and second rollers are rotatably supported by the side wall members and cooperate with each other to define therebetween a gap in substantially parallel to respective axes of the first and second rollers. A drive device is operative to drivingly rotate the first roller to forcibly move, through the gap, the belt opposite end portions received in the gap with the belt opposite end portions being contact with each other in face to face relation, while clamping the belt opposite end portions between the first and second rollers, until the tension applied to the belt reaches a desired value. A locking device locks at least one of the first and second rollers against the rotation thereof to maintain the belt opposite end portions clamped between the first and second rollers, to thereby connect the belt opposite end portions to each other to form the belt into an endless loop.

10 Claims, 3 Drawing Figures

BELT CONNECTOR DEVICE

BACKGROUND OF THE INVENTION

FIELD OF THE INVENTION

The present invention relates to a belt connector device for connecting opposite end portions of a belt to each other to form an endless belt assembly for use in belt type delivery apparatus such as a scrape conveyor, a bucket elevator or the like.

In general, a conventional scrape conveyor or bucket elevator includes a pair of end rolls and an endless belt entrained around the pair of end rolls. In such a scrape conveyor or bucket elevator, when it is desired to adjust a tension in the endless belt, it is usual to move at least one of the end rolls toward and away from the other end roll to vary the distance between the end rolls, to thereby adjust the tension in the endless belt. Specifically, at least one of the end rolls is moved toward the other end roll to decrease the tension in the endless belt, and is moved away from the other end roll to increase the tension in the endless belt.

A typical mechanism for varying the distance between the end rolls for the adjustment of the endless belt tension includes a bracket or stand by which one of the end rolls is rotatably supported, and one or more threaded shaft threadedly engaged with the bracket or stand. The rotation of the threaded shaft causes one of the end roll to move toward and away from the other end roll. Such adjustment mechanism is complicated in structure and relatively large in size so that the mounting and operating works of the adjustment mechanism are troublesome.

In addition, at each time the endless belt tension is adjusted by the above-described adjustment mechanism, it is necessary to adjust the orientation of one of the end rolls so as to have a horizontal axis in parallel to the axis of the other. The adjustment work for the orientation of the axes of the end rolls is troublesome and time-consuming. In particular, in the case where the scrape conveyor and/or bucket elevator is arranged in a relatively narrow pit as in, for example, a rice cleaning or polishing plant, the adjustment work for the axial orientation of the end rolls is more troublesome.

SUMMARY OF THE INVENTION

It is an object of the present invention to provide a belt connector device for connecting opposite end portions of a belt to each other to form an endless belt assembly for use in belt type delivery apparatus, which belt connector device enables a tension applied to the belt to be readily adjusted.

It is another object of the invention to provide the aforesaid belt connector device which is compact in structure.

According to the present invention, there is provided a belt connector device for connecting opposite end portions of a belt to each other to form an endless belt assembly for use in a belt type delivery apparatus, the belt connector device comprising: mounting means including a pair of opposed, but spaced side wall members; first and second rollers rotatably mounted on the side wall members so as to have respective rotary axes extending substantially in parallel to each other and laterally to the side wall members, the first and second rollers having their respective circumferential surfaces cooperating with each other to define therebetween a gap; drive means for drivingly rotating the first roller to forcibly move, through the gap, the opposite end portions of the belt received in the gap with the opposite end portions of the belt being in contact with each other in face to face relation, while clamping the opposite end portions of the belt between the first and second rollers, until a tension applied to the belt reaches a desired value; and locking means for locking at least one of the first and second rollers against the rotation thereof to maintain the opposite end portions of the belt clamped between the first and second rollers, to thereby connect the opposite end portions of the belt to each other to form the belt into an endless loop.

DETAILED DESCRIPTION OF THE PREFERRED EMBODIMENTS

Figure 1:
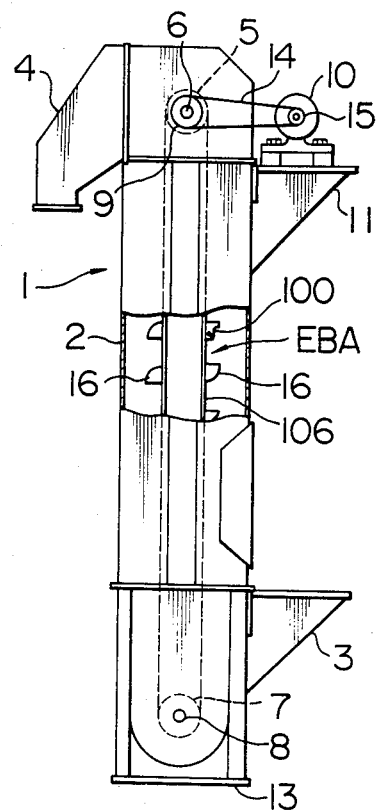
FIG. 1 is a partially broken-away, diagrammatic front elevational view showing a bucket elevator into which is incorporated an endless belt assembly comprising a belt connector device in accordance with an embodiment of the invention.
Figure 2:
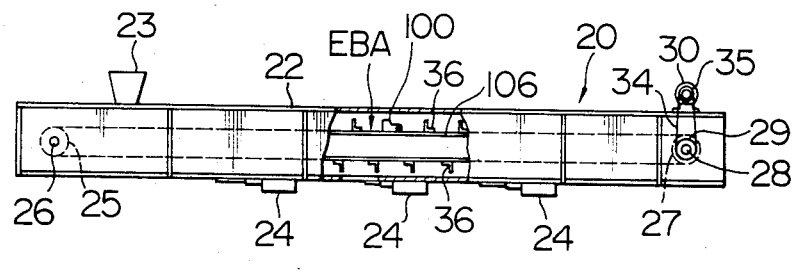
FIG. 2 is a partially broken-away, diagrammatic front elevational view showing a scrape conveyor into which is incorporated an endless belt assembly comprising the belt connector device in accordance with the embodiment of the invention.

FIGS. 1 and 2 respectively show a bucket elevator 1 and a scrape conveyor 20 each having incorporated thereinto an endless belt assembly EBA comprising a belt 106 and a belt connector device 100 in accordance with an embodiment of the invention which will be described later.

As is well known to those skilled in the art, the bucket elevator 1 shown in FIG. 1 includes an elongated housing 2, a hopper 3 located at a lower portion of the housing 2 and a discharge or outlet duct 4 located at an upper portion of the housing 2. An upper end roll 5 is fixedly mounted on a horizontal shaft 6 rotatably supported by side walls of the housing 2. A lower end roll 7 is fixedly mounted on a shaft 8 rotatably supported by the side walls of the housing 2 so as to have an axis in parallel to that of the shaft 6. The shaft 6 has an end thereof extending from the side wall of the housing 2, on which a pulley 9 is mounted for rotation with the shaft 6. An electric motor 10 is mounted on a bracket 11 fixedly secured to the housing 2. A V-belt 14 is entrained around the pulley 9 and a pulley 15 fixedly mounted on an output shaft of the motor 10. The endless belt assembly EBA having attached thereto equidistantly spaced buckets 16 is entrained around the end rolls 5 and 7.

In operation, a rotational torque of the motor 10 is transmitted through the pulley 15, the V-belt 14 and the pulley 9 to the shaft 8 to rotate the upper end roll 5, thereby causing the endless belt assembly EBA to travel. The bulk material such as, for example, grains supplied to the hopper 3 are successively received by the buckets 16 in a well known manner and are delivered upwardly. The grains are discharged upon the movement of the buckets 16 around the upper end roll 6, and are led to any desired location through the discharge duct 4.

The scrape conveyor shown in FIG. 2 includes an elongated housing 22, a hopper 23 disposed on a top wall of the housing 22 adjacent to one end thereof, and a plurality of discharge gates 24 provided at any suitable locations on the bottom wall of the housing 22. One of a pair of end rolls 25 is fixedly secured to a horizontal shaft 26 rotatably supported by side walls of the housing 22 adjacent to the one end thereof. The other end roll 27 is secured to a shaft 28 supported by the side walls of the housing 22 adjacent to the other end thereof so as to have an axis in parallel to that of the shaft 26. The shaft 28 has an end thereof extending from the side wall of the housing 22, on which a pulley 29 is mounted for rotation together with the shaft 28. An electric motor 30 is mounted on the top wall of the housing 22. A V-belt 34 is entrained around the pulley 29 and a pulley 35 fixedly mounted on the output shaft of the motor 30. The endless belt assembly EBA having attached thereto equidistantly spaced scrapers 36 is entrained around the end rolls 25 and 27.

In operation, a rotational torque of the motor 30 is transmitted through the pulley 35, the V-belt 34 and the pulley 29 to the shaft 28 to rotate the end roll 27, to thereby cause the endless belt assembly EBA to travel. The loose or bulk material fed to the hopper 23 descends onto the upper run of the endless belt assembly EBA in a well known manner, is delivered toward the one end (left end in FIG. 2) of the housing 22, is moved on the bottom wall of the housing to the other end thereof by the action of the scrapers 36, and is discharged out of the housing 22 through opened one of the discharge gates 24 disposed at any desired locations.

It is to be noted that the bucket elevator and the scrape conveyor respectively shown in FIGS. 1 and 2 and each having incorporated thereinto the endless belt assembly EBA comprising the belt 106 and the belt connector device 100 in accordance with the embodiment of the present invention does not need a mechanism for moving one of the pair of end rolls 5 and 7; 25 and 27 toward and away from the other end roll to adjust a tension in the belt 106 of the endless belt assembly. As will be described later in detail with reference to FIG. 3, the belt connector device 100 per se in accordance with the embodiment of the invention includes the mechanism for adjusting the tension in the belt 106.

Figure 3:
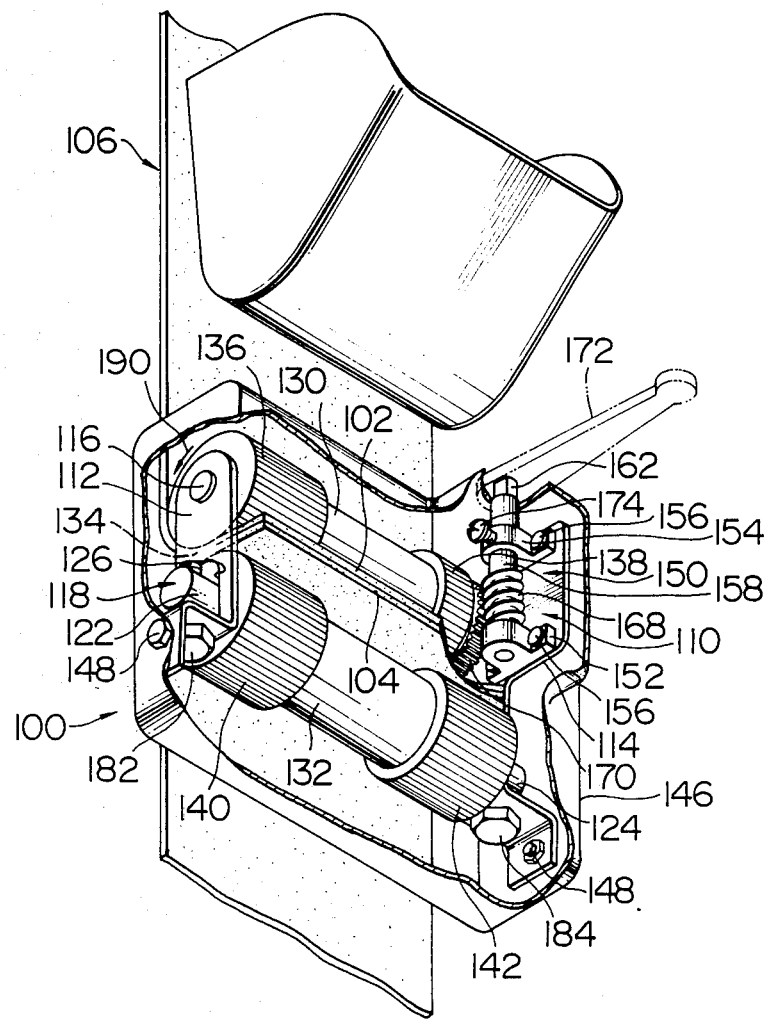
FIG. 3 is a partially broken-away, fragmental perspective view of the belt connector device in accordance with the embodiment of the invention.

FIG. 3 shows the belt connector device, generally designated by the reference numeral 100, in accordance with the embodiment of the invention, for connecting one and the other end portions 102 and 104 of the single continuous belt 106 to each other to form an endless belt assembly shown in FIG. 1 or 2. The end portions 102 and 104 of the belt 106 is illustrated in FIG. 3 as having a smoothed surface, but may have an irregular surface high in coefficient of friction. Mounting means or mounting assembly generally designated by the reference numeral 110 comprises a pair of opposed, but spaced side wall members 112 and 114. A shaft 116 extends between the side wall members 112 and 114 and has opposite ends which are rotatably supported thereby, respectively. A further shaft 118 has opposite ends 122 and 124 thereof which are received in respective elongated slots 126 (only one is seen in FIG. 3) in the side wall members 112 and 114, respectively, so as to be movable toward and away from the shaft 116.

A first roller 130 is keyed to the shaft 116 for rotation therewith. A second roller 132 is mounted on the shaft 118 through a bushing (not shown) so that the second roller 132 is rotatable relative to the shaft 118. Thus, the first and second rollers 130 and 132 are rotatably mounted on the side wall members 112 and 114 so as to have respective rotary axes extending substantially in parallel to each other and laterally to the side wall members 112 and 114. The first and second rollers 130 and 132 have their respective circumferential surfaces which cooperate with each other to define therebetween a gap 134. The circumferential surface of each of the first and second rollers 130 and 132 has end sections 136, 138 and 140, 142 which are respectively located adjacent to the side wall members 112 and 114 and are irregular to provide high coefficient of friction. The irregular end sections 136, 138 and 140, 142 are formed through, for example, a serration machining, a knurling process, a pickling process or the like.

A cover 146 is fixedly mounted on the side wall members 112 and 114 by means of bolt and nut assemblies 148 so as to cover the first and second rollers 130 and 132 and the side wall members 112 and 114.

Drive means, generally designated by the reference numeral 150, for driving rotating the first roller 130 comprises a pair of spaced and aligned mounts 152 and 154 fixedly mounted on the side wall member 114 by bolt and nut assemblies 156. A drive shaft 158 is rotatably supported by the mounts 152 and 154 and has a free end portion 162 extending through and out of a wall of the cover 146. The extending free end portion 162 of the drive shaft 158 is formed with planar surfaces. A worm 168 is keyed to that section of the drive shaft 158 which is located between the mounts 152 and 154. The worm 168 is engaged with a worm wheel 170 keyed to the shaft 116 for rotation therewith. The worm wheel 170 is interposed between the side wall member 114 and an axial end face of the first roller 130 adjacent thereto. A manual handle member 172 indicated by a phantom line in FIG. 3 is detachably connectable to the free end portion 162 of the drive shaft 158.

As is well known to those skilled in the art, the engagement between the worm 168 and the worm wheel 170 provides a locking function for preventing the worm and the worm wheel from freely rotating. In other words, the engagement between the worm 168 and the worm wheel 170 constitutes locking means for preventing the first roller 130 from freely rotating. If desired, in order to further ensure to prevent the worm 168 and the worm wheel 170 from freely rotating, a lock screw 174 may be threadedly engaged with the mount 154 so that a tip of the lock screw 174 is brought into pressure-contact with an outer surface of the drive shaft 158.

Adjusting means for adjusting the size of the gap 134 comprises the elongated slots 126 respectively formed in the side wall members 112 and 114, and bolts 182 and 184 which are rotatably supported by the side wall members 112 and 114, respectively, and are threadedly engaged with the opposite ends 122 and 124 of the shaft 118 having rotatably mounted thereon the second roller 132. Thus, the rotation of the bolts 182 and 184 enables the second roller 132 to be moved toward and away from the first roller 130 along the elongated slots 126, to thereby adjust the size of the gap 134.

In operation, with the cover 146 removed, the manual handle member 172 is engaged with the free end portion 162 of the drive shaft 158. The bolts 182 and 184 of the adjusting means are rotated to previously adjust the gap 134 so that the gap 134 has its size slightly less than the sum of the respective thicknesses of the end portions 102 and 104 of the belt 106. Then, the end portions 102 and 104 of the belt 106 are slightly received in the gap 134 with the end portions 102 and 104 being in contact with each other in face to face relation as shown in FIG. 3.

Alternatively, the bolts 182 and 184 are rotated to adjust the gap 134 so that the gap 134 has its size greater than the sum of the respective thicknesses of the end portions 102 and 104 of the belt 106. Then, the end portions 102 and 104 are inserted into the gap 134 with the end portions 102 and 104 being in contact with each other in face to face relation as shown in FIG. 3, and then the bolts 182 and 184 are again rotated to cause the second roller 132 to be moved toward the first roller 130, to thereby clamp the end portions 102 and 104 between the first and second rollers 130 and 132.

The handle member 172 is then manually operated to rotate the drive shaft 158. The rotational torque of the drive shaft 158 is transmitted through the worm 168 and the worm wheel 170 to the shaft 116, thereby causing the shaft 116 and the first roller 130 mounted thereon to be rotated in the direction indicated by an arrow 190 in FIG. 3. The respective irregular circumferential surface sections 136, 138 and 140, 142 of the first and second rollers 130 and 132 are into frictional engagement with the respective surfaces of the end portions 102 and 104 of the belt 106, to forcibly move the end portions 102 and 104 of the belt 106 through the gap 134 while clamping the end portions 102 and 104 until the tension in the belt 106 reaches a desired value. The second roller 132 is rotated due to the forcible movement of the end portions 102 and 104 through the gap 134.

When the tension in the belt 106 reaches the desired value, the rotation of the drive shaft 158 by the handle member 172 is suspended or stopped to suspend or halt the rotation of the first and second rollers 130 and 132. The engagement between the worm 168 and the worm wheel 170 locks the first roller 130 and, hence, the second roller 132 against the rotation thereof due to the tension in the belt 106, to maintain the end portions 102 and 104 of the belt 106 retained and clamped between the first and second rollers 130 and 132, thereby connecting the one end portion 102 and the other end portion 104 of the belt 106 to each other to form the belt 106 in an endless loop. Thereafter, the lock screw 174 is tightened to be into intimate pressure-contact with the outer surface of the drive shaft 158, to thereby further ensure the locking of the worm 168 against the rotation thereof. Thereafter, the handle member 172 is removed from the free end portion 162 of the drive shaft 158. If the end portions 102 and 104 of the belt 106 are excessively projected from the gap 134, the excessively projected end portions 102 and 104 may be severed to an appropriate length. Finally, the cover 146 is mounted to the side wall members 112 and 114 by the bolt and nut assemblies 148.

When it is desired to disconnect the end portions 102 and 104 of the belt 106 from each other, the bolts 148 are loosened to remove the cover 146 from the side wall members 112 and 114. Then, the bolts 182 and 184 of the adjusting means are loosened to cause the shaft 118 and the second roller 132 rotatably mounted thereon to be moved away from the shaft 116 and the first roller 130 fixedly mounted thereon to widen the gap 134. Thus, the end portions 102 and 104 of the belt 106 can be withdrawn from the widened gap 134.

Alternatively, after the removal of the cover 146 from the side wall members 112 and 114, the handle member 172 is engaged with the free end portion 162 of the drive shaft 158, and then the lock screw 174 is loosened. Thereafter, the handle member 172 is rotated in such direction as to cause the first roller 130 to be rotated in the direction opposite to the direction indicated by the arrow 190. Thus, the end portions 102 and 104 of the belt 106 are forcibly moved through the gap 134 while clamping the belt end portions 102 and 104 between the first and second rollers 130 and 132, and are withdrawn from the gap 134, with the second roller 132 being rotated due to the forcible movement of the belt end portions 102 and 104 through the gap 134.

Although the shaft 118 having rotatably mounted thereon the second roller 132 has been described as being mounted on the side wall members 112 and 114 so as to be movable toward and away from the shaft 116 having fixedly mounted thereon the first roller 130 to adjust the size of the gap 134, the shaft 118 may be fixedly mounted on the side wall members 112 and 114 so as to define the gap 134 having a fixed or constant size. In this case, the adjusting means comprising the slots 126 and the bolts 182 and 184 is unnecessary and, in addition, the drive means 150 may be associated with the fixedly mounted shaft 118 in place of the shaft 116, or the drive means 150 driving connected to the shaft 116 may also be driving connected to the shaft 118 through a gearing so that the shafts 116 and 118 are rotated in their respective directions opposite to each other.

As described above, the present invention is arranged such that one and the other end portions 102 and 104 of the belt 106 is inserted and fixed in the gap 134 defined between the first and second rollers 130 and 132 to connect the one and the other end portions 102 and 104 of the belt 106 to each other to form the belt 106 into an endless loop, and the rotation of the first roller 130 by means of the drive means 150 enables the tension applied to the belt 106 to be adjusted. Such structure and arrangement according to the present invention have such advantages that it is possible to dispense with a mechanism for adjusting the belt tension by changing the distance between the end rolls in accordance with the prior art described before, to make compact the structure for the belt type delivery apparatus. Thus, the structure and arrangement according to the invention can provide a solution or approach to such problem that the work for mounting and operating the conventional belt tension adjustment mechanism is troublesome and the work for adjusting the orientation of the end rolls so as to make the respective axes of the end rolls in parallel to each other is troublesome.

Incidentally, although the invention can dispense with the mechanism for adjusting the tension of the belt by changing the distance between the end rolls in accordance with the prior art, even if the invention is used together with such conventional mechansim, the invention is still superior than the prior art in the simplification of belt connecting work. Therefore, even in such a case, it is expected that the invention offers a satisfactory advantage.

What is claimed is:

1. A belt connector device for connecting opposite end portions of a belt to each other to form an endless belt assembly for use in a belt type delivery apparatus, said belt connector device comprising:
   mounting means including a pair of opposed, but spaced side wall members;
   first and second rollers rotatably mounted on said side wall members so as to have respective rotary axes extending substantially in parallel to each other and laterally to said side wall members, said first and second rollers having their respective circumferential surfaces concentric with their respective axes, the respective circumferential surfaces of said first and second rollers cooperating with each other to define therebetween a gap;

drive means cooperating with said first roller for drivingly rotating said first roller to forcibly move, through said gap, the opposite end portions of the belt received in said gap with the opposite end portions of the belt being in direct contact with each other in face to face relation, while clamping the opposite end portions of the belt between said first and second rollers, until a tension applied to the belt reaches a desired value when the opposite end portions of the belt are forcibly moved through said gap by said drive means, said gap being set to have its size slightly less than the sum of the respective thicknesses of the opposite end portions of the belt; and locking means cooperating with at least one of said first and second rollers for locking said at least one of said first and second rollers against rotation thereof to maintain the opposite end portions of the belt frictionally retained in said gap between said first and second rollers so as to be prevented from coming out of said gap, to thereby connect the opposite end portions of the belt to each other to form the belt into an endless loop.

2. A belt connector device as set forth in claim 1, wherein the respective circumferential surfaces of said first and second rollers are irregular so as to be respectively brought into frictional engagement with respective surfaces of the opposite end portions of the belt received in said gap.

3. A belt connector devide as set forth in claim 1 or 2, wherein said second roller is mounted on said side wall members so as to be movable toward and away from said first roller, said belt connector device further comprising adjusting means for moving said second roller toward and away from said first roller to adjust the size of said gap.

4. A belt connector device as set forth in claim 3, wherein said mounting means further comprises a shaft on which said second roller is mounted rotatably relative to said shaft, and wherein said adjusting means comprises an elongated slot in each of said side wall members, said shaft having opposite ends thereof movably received in the respective slots in said side wall members, respectively, and bolt means rotatably supported by said side wall members and threadedly engaged with the opposite ends of said shaft.

5. A belt connector device as set forth in claim 4, wherein said mounting means further comprises a second shaft extending between said side wall members and rotatably supported thereby, said first roller being mounted on said second shaft for rotation therewith, said drive means being drivingly connected to said second shaft to cause the same to be rotated to rotate said first roller.

6. A belt connector device as set forth in claim 5, wherein said drive means comprises a worm wheel mounted on said second shaft for rotation therewith, a drive shaft rotatably supported by mounts secured to one of said side wall members, a worm mounted on said drive shaft for rotation therewith and engaged with said worm wheel, and a manual handle member connected to said drive shaft so as to rotate the same.

7. A belt connector device as set forth in claim 6, wherein said manual handle member is detachable from said drive shaft.

8. A belt connector device as set forth in claim 7, wherein said locking means comprises the engagement between said worm and said worm wheel.

9. A belt connector device as set forth in claim 8, further comprising a cover fixedly mounted on said side wall members of said mounting means so as to cover said first and second rollers, said drive shaft having one end thereof extending through and out of a wall of said cover, said handle member being detachably connectable to the one end of said drive shaft, said locking means further comprising a lock screw threadedly engaged with one of said mounts and having a tip abutting against said drive shaft.

10. A belt connector device as set forth in claim 9, wherein the circumferential surface of each of said first and second rollers has end sections which are respectively located adjacent to opposite ends of the roller and which are irregular to provide high coefficient of friction.

* * * * *